(12) United States Patent
Graupner et al.

(10) Patent No.: US 7,370,470 B2
(45) Date of Patent: May 13, 2008

(54) METHOD FOR INCREASING THE EXHAUST GAS TEMPERATURE OF INTERNAL COMBUSTION ENGINES

(75) Inventors: Olaf Graupner, Küfering (DE); Gerhard Wissler, Sünching (DE)

(73) Assignee: Siemens Aktiengesellschaft, Munich (DE)

( * ) Notice: Subject to any disclaimer, the term of this patent is extended or adjusted under 35 U.S.C. 154(b) by 142 days.

(21) Appl. No.: 11/011,346

(22) Filed: Dec. 14, 2004

(65) Prior Publication Data

US 2005/0148430 A1 Jul. 7, 2005

(30) Foreign Application Priority Data

Dec. 18, 2003 (DE) ................. 103 59 674

(51) Int. Cl.
*F01N 3/00* (2006.01)
(52) U.S. Cl. .............. 60/284; 60/274; 60/300; 123/681; 477/98; 477/100
(58) Field of Classification Search ............ 60/274, 60/284, 285, 295, 300; 123/672, 681; 477/98, 477/100, 107; 701/54, 56, 104
See application file for complete search history.

(56) References Cited

U.S. PATENT DOCUMENTS

| | | | |
|---|---|---|---|
| 5,437,153 A | 8/1995 | Takeshima et al. | ........... 60/276 |
| 5,668,727 A * | 9/1997 | Pellerito et al. | ............ 701/105 |
| 5,784,878 A * | 7/1998 | Kato et al. | ................... 60/274 |
| 6,079,204 A * | 6/2000 | Sun et al. | ...................... 60/274 |
| 6,389,352 B1 * | 5/2002 | Sun et al. | .................... 701/102 |
| 6,434,475 B2 * | 8/2002 | Kaneko et al. | ............. 701/112 |
| 6,516,609 B2 * | 2/2003 | Igarashi et al. | ............... 60/284 |
| 6,591,811 B2 * | 7/2003 | Kaltenbrunn et al. | ....... 123/435 |
| 6,668,781 B1 * | 12/2003 | Seils et al. | ............... 123/179.3 |
| 6,809,428 B1 * | 10/2004 | Blackburn et al. | ........ 290/37 R |
| 6,935,989 B2 * | 8/2005 | Shibagaki | ..................... 477/98 |
| 7,007,460 B2 * | 3/2006 | Frieden et al. | ................ 60/284 |
| 7,021,051 B2 * | 4/2006 | Igarashi et al. | ............... 60/295 |
| 2005/0148430 A1 | 7/2005 | Graupner et al. | ........... 477/184 |
| 2007/0251220 A1 * | 11/2007 | Dawson et al. | ............... 60/295 |

FOREIGN PATENT DOCUMENTS

| | | |
|---|---|---|
| DE | 3608370 | 9/1987 |
| DE | 63926217 T2 | 12/1993 |
| DE | 10130634 | 1/2003 |

* cited by examiner

*Primary Examiner*—Tu M. Nguyen
(74) *Attorney, Agent, or Firm*—Baker Botts L.L.P.

(57) ABSTRACT

A method for increasing the exhaust gas temperature of internal combustion engines, particularly for driving a motor vehicle under load in order to reach the necessary regeneration temperature of at least one component of an exhaust gas post-treatment system, has the step of placing the engine under load by at least one of the brakes of the motor vehicle and/or by the starting element of the motor vehicle.

17 Claims, 2 Drawing Sheets

METHOD FOR INCREASING THE EXHAUST GAS TEMPERATURE OF INTERNAL COMBUSTION ENGINES

PRIORITY

This application claims priority to German application no. 103 59 674.7 filed Dec. 18, 2003.

1. Technical Field of the Invention

The invention relates to a method for increasing the exhaust gas temperature of internal combustion engines, particularly for driving a motor vehicle under load in order to reach the necessary regeneration temperature of at least one component of an exhaust gas post-treatment system.

2. Description of the Related Art

In order to comply with the strict legal requirements for the emissions of internal combustion engines, it is necessary that the exhaust gases of spark ignition engines and diesel engines be cleaned using exhaust gas post-treatment in order to comply with the legal requirements. Well-known components of an exhaust gas post-treatment system are particle filters and $NO_x$ storage catalytic converters.

These components have the feature that for specific operating conditions, increased exhaust gas temperatures are required. These are usually represented by injecting fuel afterwards, which is converted thermally in a downstream catalytic converter. Additional well-known measures are late injection, post-injection and throttling. By means of these interventions, the exhaust gas temperature can be increased by approximately 200° C.

Compared to a spark ignition engine, a diesel assembly has a better thermodynamic efficiency, which is reflected in lower exhaust gas temperatures. However, the development of modern diesel engines with lower fuel consumption, particularly direct injection engines, brings about an additional reduction of the exhaust gas temperature in the ECE cycle (low load range).

In addition, the combustion of diesel fuel containing sulfur primarily results in $SO_2$ which, at temperatures >300° C., is oxidized further by the noble metals to $SO_3$ and in the presence of water causes a reaction forming sulfuric acid. In this way, all three compounds are in a position to deactivate the catalytic converter. Furthermore, the sulfate is considerably more temperature-stable than $NO_x$ converted to nitrate. As a result, by selecting the suitable $NO_x$ storage components, the desulfurization of diesel exhaust gases can be reduced. At present, the temperatures range between 500 and 550° C. On the other hand, the $NO_x$ conversion lies in a temperature range between 150 and 300° C. Without desulfurization measures (current sulfur content in the diesel fuel ranges between 10 and 450 ppm), the $NO_x$ conversion rate of the storage catalytic converter in the lean/rich cycle is reduced linearly as a function of the traveling distance or the time.

The internal combustion vehicle operated in the low load, i.e. for example only short distances without having to increase the operating temperature of the engine, generates exhaust gas temperatures (<400° C.) that are too low to be increased to a suitable degree by means of conventional measures for regeneration, particularly in the case of very low ambient temperatures. As a result, this also applies to idling operation because the exhaust gas temperatures are even lower than in the low load range.

SUMMARY OF THE INVENTION

Therefore, it is the object of the invention to propose a method that permits the regeneration of components of an exhaust gas post-treatment system under difficult thermal conditions, such as in the low load or idling operation.

In the case of the method according to the invention for increasing the exhaust gas temperature of internal combustion engines, particularly for driving a motor vehicle under load in order to reach the necessary regeneration temperature of at least one component of an exhaust gas post-treatment system, at least one brake of the motor vehicle and/or the starting element of the motor vehicle is provided to place it under load. Therefore, in this case, it is particularly advantageous that the two above-mentioned measures can be used to engage the brake or to engage the starting element in order to increase the exhaust gas temperature. As a result, if only a slight increase in the exhaust gas temperature is required, either can be used. This is particularly the case if the engine is operated in the middle load range.

In a preferred embodiment of the invention, the engine is placed under load only if the temperature of the brakes or of the starting element is lower than a respective corresponding limit temperature. This security precaution avoids a possible overheating of the brakes or the starting elements.

It has been proven to be particularly advantageous to increase the engine torque accordingly when the engine is placed under load, in order to raise the exhaust gas temperature. As a result, it is guaranteed that the intervention is not observed by the driver, although an additional mechanical load was added such as the above-mentioned brakes or starting elements. Starting element should here be understood as a clutch or a torque converter. This includes all the types of clutches such as friction clutches, multiple disk clutches and electrical magnetic particle clutches. In addition, the brakes also include friction brakes, retarders (sustained-action brakes) and eddy-current brakes. In this way, in the case of friction brakes, the temperature of the brakes can for example be measured on the disks or on the brake pads. Likewise, a corresponding activation of the internal braking systems for a gear selection can particularly be used for automatic transmissions.

It has been proven to be particularly advantageous to allow the engine torque transferred by the clutch to take place by slipping. This particularly applies to low driving speeds if the power loss to be introduced by the braking system is limited and particularly for the stoppage of the motor vehicle. As a result, by regulating the contact pressure, the clutch becomes the torque converter and this means that it is possible to set a variable mechanical load that can be connected via the contact pressure.

In this case, a particular embodiment of the invention is to prevent a rolling forward of the stationary motor vehicle by using the brakes to lock the tires of the vehicle. Therefore, in such a case, this means that if the vehicle is stationary and the engine is running, the engine can only be placed under load by the starting element. In this case, the additionally occurring torque of a clutch or a torque converter must be maintained by the brakes.

Likewise, it is also been proven to be advantageous to brake or lock at least one of the driven wheels of the vehicle. In this way, by increasing the load of the engine, an additional torque appears that only acts on the wheels driven by the engine. As a result, it is completely sufficient to brake or lock these. In addition, it can also be practical to lock wheels that are not being driven.

It has been proven as particularly advantageous, in the case of critical driving situations, to avoid or terminate the placing of the engine under load by the brakes and/or by the starting element. If the $NO_x$ storage catalytic converter or the particle filter is regenerated, in that the engine load was increased, the engine load must be throttled to a normal degree when the driver wishes to apply full braking, so that the brakes can slow the vehicle down to the maximum. The regeneration must likewise be avoided or terminated if the sensors connected to the ESP indicate that the vehicle is in the extreme range or in this case threatens to swerve. In such a case, it must be guaranteed that the regeneration procedure does not adversely affect the ESP (Electronic Stability Program).

BRIEF DESCRIPTION OF THE DRAWINGS

The invention is explained in greater detail below by referring to the following diagrams. These are as follows.

DETAILED DESCRIPTION OF THE PREFERRED EMBODIMENTS

Figure 1:
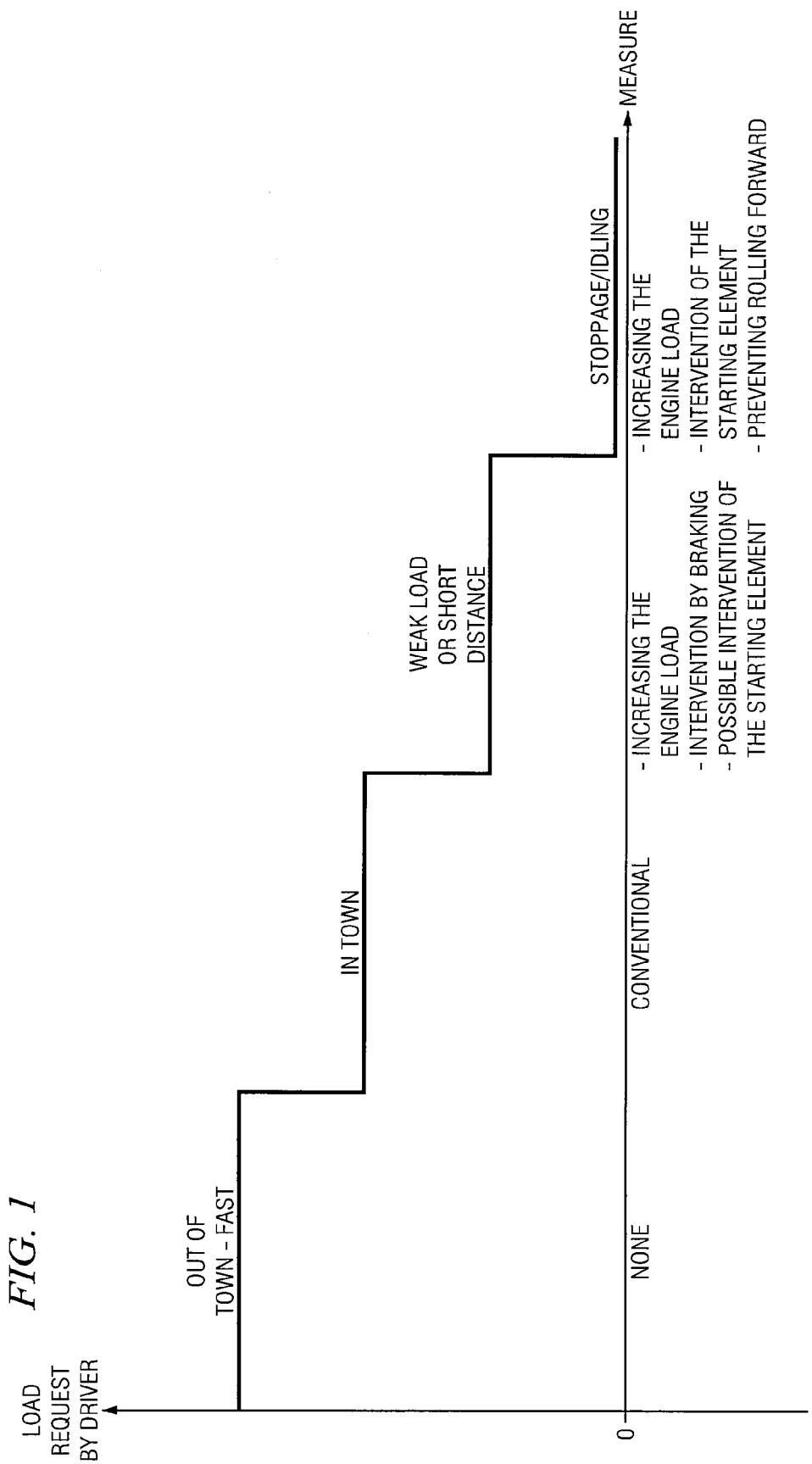
FIG. 1 A graph showing the dependence between the engine load that is being applied and the corresponding measures that are needed in order to reach the regeneration temperature.

FIG. 1 represents a graph showing all the measures that are required in order to reach sufficiently high exhaust gas temperatures as a function of the engine load. In addition, FIG. 1 is described from left to right. The optimum condition for regenerating the sulfur of an $NO_x$ storage catalytic converter is when the motor vehicle is traveling at high speed on the highway (fast out of town). No special measures are required because the exhaust gas temperature is sufficient for the desulfirization of the $NO_x$ storage catalytic converter. In the higher partial load range, typically journeys in town, the exhaust gas temperatures are approximately at 400° C. In this way the above-mentioned measures for increasing the exhaust gas temperature (e.g. rich operating state) are sufficient, but in the case of exhaust gas temperatures reduced further, additional measures such as the described intervention by braking are required.

Figure 2:
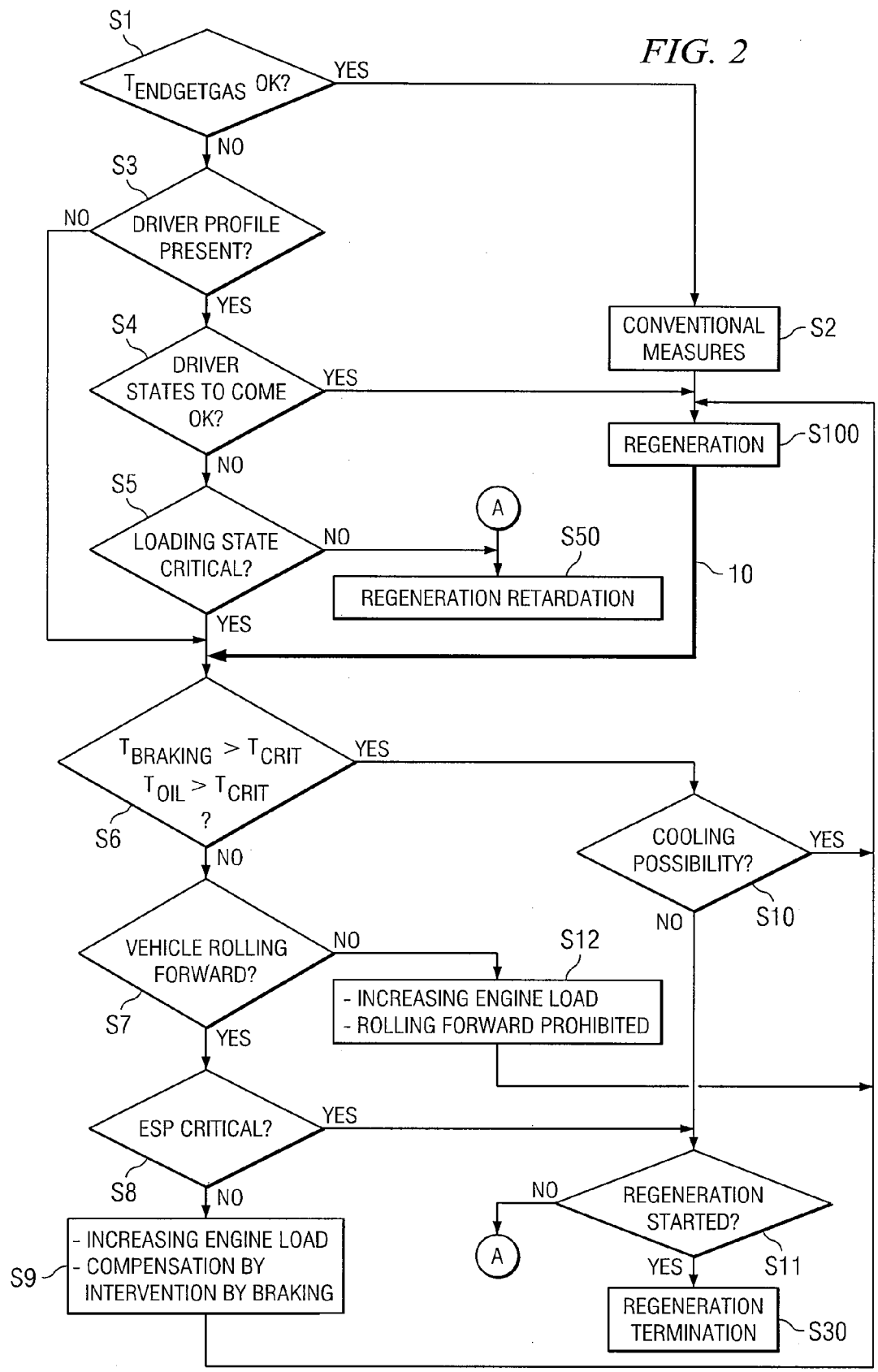
FIG. 2 a flow chart with measures to increase the exhaust gas temperature.

FIG. 2 is described in greater detail below. In step S1, the requirements for regenerating, for example of the $NO_x$ storage catalytic converter, are checked. In the case of exhaust gas post-treatments, it must be guaranteed that the exhaust gas temperature $T_{exhaust\ gas}$ is sufficiently high. As has been described above, this is the case if the exhaust gas temperature is at least 400° C., because then the conventional measures (rich operating state) are sufficient in step S2 in order to reach the regeneration temperature of approximately 650° C. Subsequently, the regeneration takes place in step S100. If the exhaust gas temperature is high enough, step 2 can be skipped and the regeneration of the $NO_x$ storage catalytic converter can be started in step S100. If the exhaust gas temperature measured in step S1 is not sufficient, a check is performed to determine whether or not a suitable driving state is to be expected in step S3 in the stored profile of the driver. This means that the vehicle electronics statistically evaluate the driving behavior of the driver. In this way, an evaluation in step S4 can identify whether or not the vehicle will soon be driven in a full load or a partial load range. If such a driving state is to be expected, the steps S2 and S100 are carried out in the same way as step S100. If no optimum driving states are to be expected, step S5 follows, in which a check is performed to determine whether or not the $NO_x$ storage catalytic converter is in a critical load state. If this is not the case, the regeneration can be postponed to step S50. It is practical to install a warning lamp in the display panel which indicates that the particle filter or the $NO_x$ storage catalytic converter is in a critical state. Therefore, if the load state is critical, step S6 follows. In this way, according to the invention, the temperatures of the brakes and/or the oil temperature of the torque converter or the temperature of the clutch are checked. In this case it can also be practical to measure 1, 2 or all 3 temperatures or, for example, to simulate them on the basis of a model. If the brakes are, for example, cool enough so that no fading can take place, step S7 follows. In this case, a check is only performed to determine whether the vehicle is rolling forward. If the vehicle is not rolling forward, step S12 follows. In this case, an additional mechanical load is only reached by means of the starting element. In this case, the engine load must be increased, whereby for example this additionally occurring energy must be completely absorbed by the torque converter. This heat energy is routed to the transmission oil. In addition, the torque at the driven wheels increases in such a way that the contact pressure at the brake shoes must possibly be increased there. A rolling forward must be prohibited without fail if it is evident that this is requested by the driver. After these measures have been carried out, the regeneration can be started in step S100. During the regeneration, step S100 is continuously checked via path 10 to determine whether or not in step S6 the temperatures of the brakes, of the oil or the clutch are in order as before. If one of these variables exceeds the critical temperature $T_{crit}$, step S10 follows, in the case of which a check is performed to determine whether or not it is possible to take cooling measures. If this is the case, the regeneration could be continued in step S100. If this is not the case, a check will be performed in step S11 to determine whether or not the regeneration has already started in step S100. Accordingly, step S50 follows, thus a regeneration retardation or accordingly the termination of the regeneration in step S30 follows. In this way, it could be practical to document regeneration terminations in step S30 in order to indicate a possible exchange of an $NO_x$ storage catalytic converter. If the vehicle rolls forward, as is tested in step S7, a check will first of all be performed to determine whether or not the vehicle is in a critical state (step S8). Therefore, if the response is yes, step S11 follows. If not, then (step S9) the brakes can be activated parallel to the engine that is placed under load, i.e. the engine load is increased accordingly, in which case this additional energy is either absorbed by the brakes or by the starting element or by both. After these measures, step S100 follows. The temperatures of the brakes, the oil and the clutch are checked as before via path 10. Accordingly, a reaction likewise takes place in this case, if the above-mentioned events are fulfilled here.

Particularly, both the sequence and the procedural events shown in FIG. 2 are not specifically determined, but can be carried out in any technically meaningful sequence.

We claim:

1. A method for increasing the exhaust gas temperature of internal combustion engines, for driving a motor vehicle under load in order to reach the necessary regeneration temperature of at least one component of an exhaust gas post-treatment system, comprising the steps of determining a temperature of at least one brake;
determining a temperature of a starting element;
determining an oil temperature of a torque converter, placing the motor vehicle under load by activating the at least one brake and one staffing element wherein the engine is only placed under load if the oil temperature of the torque converter or the temperature of the at least one brake and the starting element is lower than a respective corresponding limit temperature.

2. The method according to claim 1, wherein the temperature of the at least one brake and the starting element is determined by simulation.

3. The method according to claim 1, wherein when the engine is placed under load, the starting element prevents the stationary vehicle from rolling forward.

4. The method according to claim 1, wherein at least one of the driven wheels of the vehicle is braked or locked.

5. The method according to claim 1, wherein in the case of a critical driving situation, placing the motor vehicle under load by at least one of the brakes and the starting element is avoided or terminated.

6. The method according to claim 1, wherein on reaching the corresponding regeneration temperature, the component of the exhaust gas post-treatment system is regenerated.

7. The method according to claim 1, wherein the component of an exhaust gas post-treatment system is at least one of a particle filter and an $NO_x$ storage catalytic converter.

8. The method according to claim 1, wherein the starting element is a clutch or a torque converter.

9. The method according to claim 8, wherein a torque is transferred by the clutch or the torque converter by slipping.

10. A method for increasing the exhaust gas temperature of internal combustion engines, comprising the steps of:
   determining an oil temperature of a torque converter;
   determining a temperature of at least one brake;
   determining a temperature of a staffing element;
   in case said oil temperature of the torque converter, said temperature of at least one brake, and said temperature of the starting element are each under a respective predetermined threshold temperature:
      activating at least one brake;
      placing the motor vehicle under load by means of the starting element of a transmission system coupled with said internal combustion engine.

11. The method according to claim 10, wherein the temperature of the oil of the torque converter, the at least one brake, and the staffing element are determined by simulation.

12. The method according to claim 10, wherein the torque is transferred by the torque converter by slipping.

13. The method according to claim 10, wherein when the engine is placed under load, the clutch or torque converter prevents the stationary vehicle from rolling forward.

14. The method according to claim 10, wherein at least one of the driven wheels of the vehicle is braked or locked.

15. The method according to claim 10, wherein in the case of a critical driving situation, placing the motor vehicle under load by the brakes and the clutch or torque converter is avoided or terminated.

16. The method according to claim 10, wherein on reaching the corresponding regeneration temperature, the component of the exhaust gas post-treatment system is regenerated.

17. The method according to claim 10, wherein the component of an exhaust gas post-treatment system is at least one of a particle filter and an $NO_x$ storage catalytic converter.

* * * * *